Figure 6:
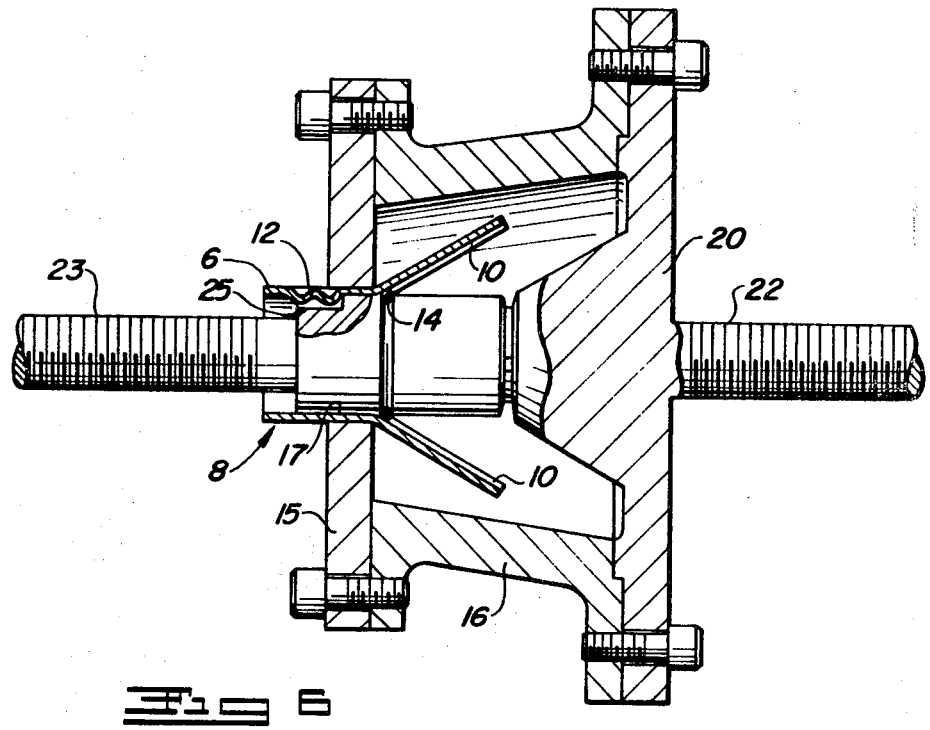

United States Patent

[11] 3,604,741

| [72] | Inventor | Frank W. Steere, Jr. |
| | | Akron, Ohio |
| [21] | Appl. No. | 851,423 |
| [22] | Filed | Aug. 19, 1969 |
| [45] | Patented | Sept. 14, 1971 |
| [73] | Assignee | Steere Enterprises, Inc. |
| | | Tallmadge, Ohio |

[54] DOORKNOB
2 Claims, 13 Drawing Figs.

[52] U.S. Cl. .................................................. 292/347
[51] Int. Cl. .................................................. E05b 1/04
[50] Field of Search ............................................ 292/347,
DIG. 38, 349, 353, 352; 74/543, 548, 553; 287/53
H; 16/118, 121; D8/138, 139, 140, 141, 142, 143,
144, 145, 147, 146

[56] References Cited
UNITED STATES PATENTS

| 82,629 | 9/1868 | Needham | 16/121 |
| 2,149,375 | 3/1939 | Wiebe | 292/347 |
| 1,132,093 | 3/1915 | Holton | 74/553 |
| 2,142,791 | 1/1939 | Koza | 74/553 X |
| 2,151,626 | 3/1939 | Travers | 287/53 |
| 2,425,611 | 8/1947 | Frost | 292/347 |
| 2,864,642 | 12/1958 | Murphy | 292/353 |
| 3,096,115 | 7/1963 | Patriguin | 292/347 |

*Primary Examiner*—Ernest R. Purser
*Assistant Examiner*—Edward J. McCarthy
*Attorney*—Gordon C. Mack ABSTRACT: A cast hollow plastic knob which may be of flexible elastomeric material or hard material or a sponge, is formed with relatively rigid support means located interiorly to reduce or prevent any tendency for the knob to collapse when pressed or grasped. It may be a larger knob, e.g. a doorknob or a smaller knob, e.g. a cupboard or drawer pull. The support means may comprise an outwardly flaring extension of the tube which supports the knob, if a doorknob, or any one of a variety of other means. The knob is rotationally cast from any suitable material, for example, a plastisol, preferably a vinyl plastisol. It may be made of foamed polyurethane or foamed vinyl plastisol, etc., and for the latter construction a separate vinyl skin may cover the foam. It may be cast from a powder of nylon or other resin. The outward portion of the flaring support is usually so close to the inner wall of the cavity in which the knob is cast, that the plastic material bridges the gap between the two. The plastic is fused by heating during and/or after being cast.

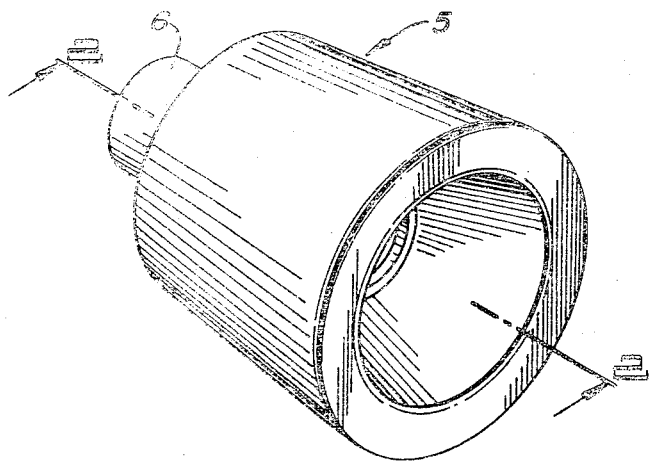
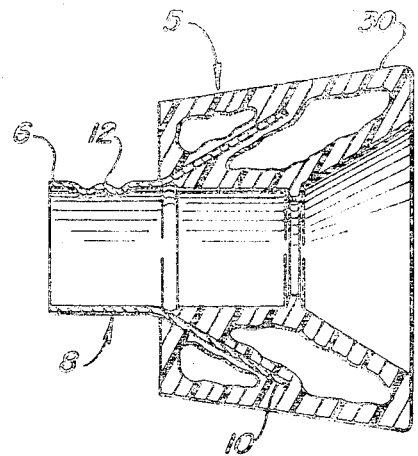
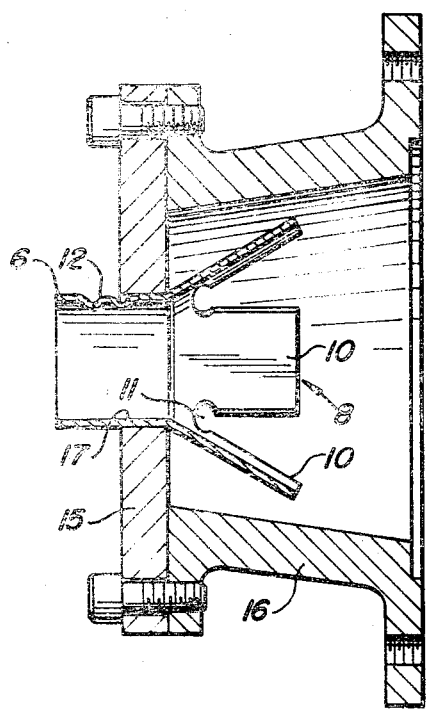
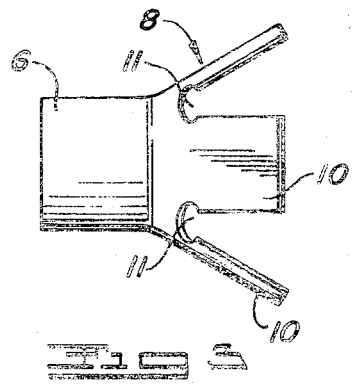
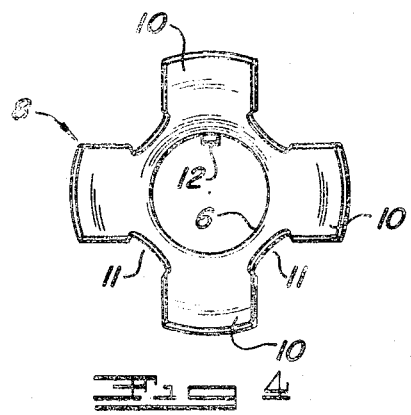
INVENTOR.
FRANK W. STEERE, JR.

INVENTOR.
FRANK W. STEERE, JR
BY
ATTORNEY

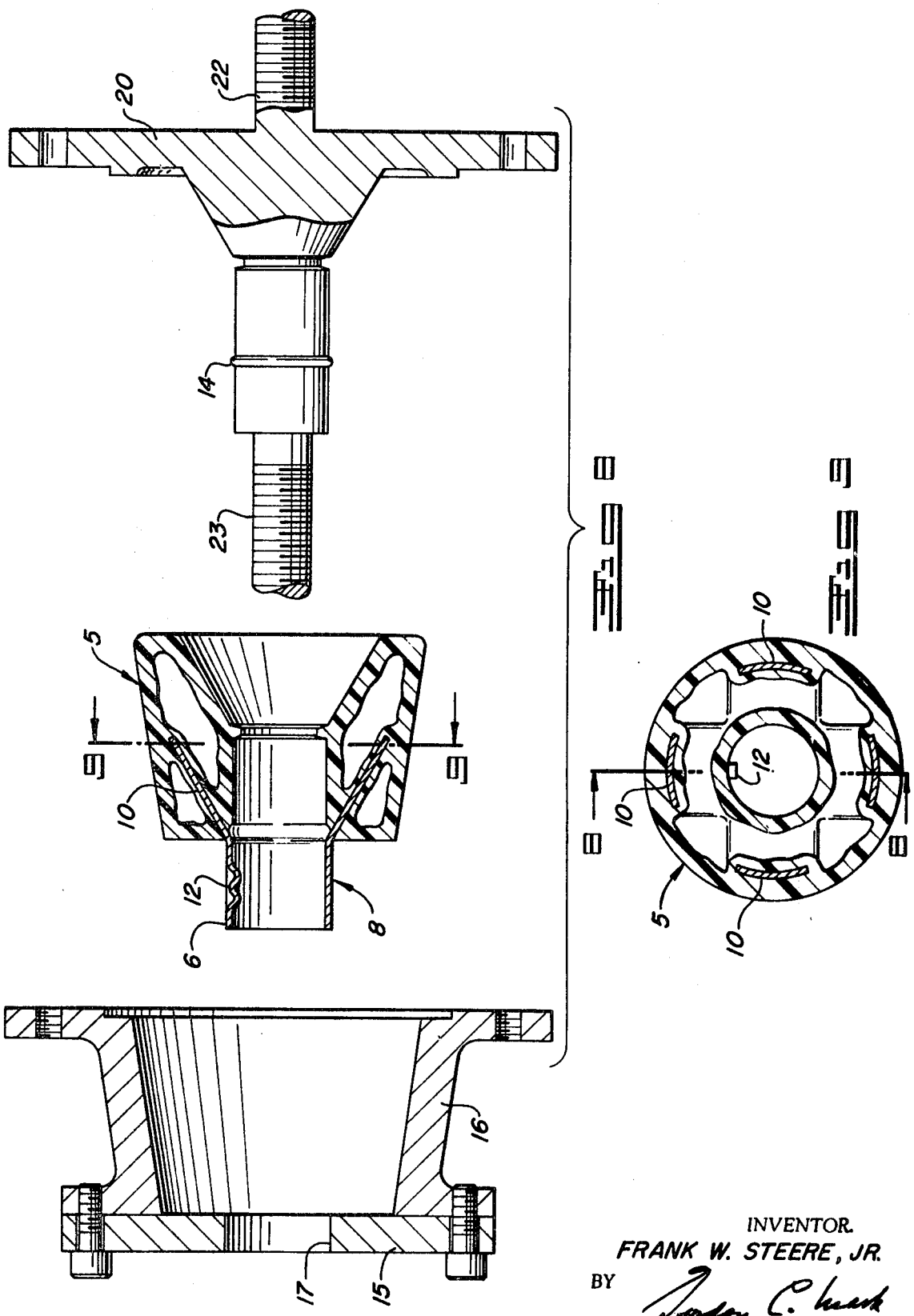

INVENTOR.
FRANK W. STEERE, JR.
BY
ATTORNEY

DOORKNOB

This invention relates to cast hollow plastic knobs, particularly for use as a door knob but suited for use on cupboards and drawers, etc., and the method of making them.

There are many advantages in making different types of knobs of plastic. The plastic is cast on a relatively rigid support. For instance, door knobs are advantageously made with an elastomeric plastic so that when swung open against a wall they do not mar the wall, and door stops may be omitted. Door knobs and pulls for cabinets and drawers are advantageously made with plastic to prevent static discharge. Also, plastics may be made in attractive colors. By making the knob hollow, the amount of plastic required is minimal, and this may represent a substantial economic advantage.

The door knob of this invention is hollow. The term "hollow" is used herein in a general sense because the knob includes relatively rigid internal support means which will be described more particularly in what follows and this support means located interiorly of the knob, prevents the entire interior from being hollow, although most of it is hollow. The knob may be of any desirable shape and its surface may be plain or carry a design.

The nature of the internal support means will depend upon the shape of the knob. It prevents lateral collapse of the knob when grasped for turning or pulling or when subjected to any other compressive force, and prevents vertical collapse of the knob as when the knob is a doorknob and the door is swung open and hits a wall. Generally, this support means will not extend so far toward the end of a knob as to prevent the knob from making unsupported cushioned contact with a wall or other means.

The door knob is advantageously formed on the end of a tube or rod equipped with some sort of support means. The tube or rod and the support may be formed of metal or rigid plastic. The support may be formed integrally with the tube or rod or it may be a separate element or elements suitably attached thereto. A simple form of support constitutes a flange which is fastened to the tube or rod, or formed integrally with it. A preferred form of support means is a modification of the end of such a tube. The support may project perpendicularly outwardly from the tube, but in this preferred form it usually flares at an angle of less than 45° from the axis of the tube. Depending upon the depth and diameter of the knob and the depth and diameter of the support, it may flare from the axis at an angle of no more than about 20° from the axis of the knob.

The support for a door knob or other knob is generally rigid but it may have some give. If the knob is very deep the support means may be so constructed as to provide two or more flaring tiers which provide spaced lateral supports for the knob. The preferred type of support for a tube is fabricated from the end of the tube. The end may be spun to flare outward, but preferably the end is slotted to provide sections which are flared outward. Alternatively, the support may be a sort of cap that fits over the end of the tube or rod or other support within the knob, or it may be a washer that fits around the tube or rod, or it may be of other suitable construction. It is usually fashioned to make a friction fit, but it may be fastened by mechanical means or by an adhesive. It need not provide support for the end of the knob but will support the knob laterally.

The outermost portion of the support, whatever its form, is usually so close to the surface of the mold cavity in which the knob is molded, that the material of which the knob is formed bridges the space between this mold surface and this outermost portion of the support means. Thus the knob is supported interiorly and is prevented from collapse, and if the knob material is elastomeric, there is a substantial cushion of it between the end of the knob and the support. The plastic which forms the end or face of the knob is joined to the plastic that covers the support, and this is generally desirable because otherwise the knob under some lateral or angular stress can be easily tipped or cocked relative to its support. The knob is so designed that the face (which is the portion of the knob which contacts the wall when the door is swung wide open) is sufficiently soft and flexible to prevent the wall being damaged.

The surface of the support to which the cast material is bonded, will usually be rough. Thus it may be provided with perforations which are filled with elastomer which is integral with the material of the knob surface, or it may have ribs or the like embedded in the plastic. The irregularity of the surface may be formed by drilling it or merely etching or scarifying it. Usually the surface will be primed so as to make a chemical bond with the cast material so as not to depend solely on the mechanical bond. The bond may be chemical or mechanical or both.

The knob may be cast from any one of a variety of castable materials which will usually be fused in some manner before removal from the mold. The material may be a liquid, such as a vinyl plastisol (which is subsequently heated to solidify and fuse it) or a nylon or other powder which is subsequently heated to fuse it, or a foam of a polyurethane or vinyl plastisol which is subsequently heated to foam and fuse it. Thus, it may be a liquid or a powder or a liquid foam.

The knob is usually formed by rotational casting, and is then preferably formed from a vinyl plastisol or any suitable plastic powder. It may be formed by low-pressure molding or by sponging, using an elastomeric material which contains a foaming agent. If sponged, polyurethane plastic which forms an exterior skin is advantageously employed, although vinyl plastic may be used, in which case a separate vinyl skin is usual. The knob may be made of any color or blend of colors and the durometer of the material and the thickness of the wall or density of the foam will be regulated so as to give the desired firmness when the knob is grasped. The plastic material must be sufficiently stiff to hold its shape where not directly supported by the support means. A wide variety of formulations may be used and the hardness may be varied. The thickness may vary substantially. Ordinarily a deposit over the support of about one-eighth inch in thickness will give the desired firmness, but this may be varied depending upon the size and configuration of the knob and the physical properties of the plastic material.

A door knob may be formed on the rod or tube which extends into the door lock, or it may be formed on a separate rod or tube. In producing the latter type of knob, the rod or tube on which the knob is formed will usually extend outward from the knob and this end will not be covered with the plastic. This specification refers more particularly to an elastomeric door knob formed on the flared, divided end of a tube, and where this type of support is shown in the drawings and the knob is formed by rotational casting or a similar procedure, it will be referred to as an insert, because it will serve as an insert in the molding operation. The support, whether it be the flared end of the tube or a flange or the like fastened to a tube or rod, will preferably be located entirely within the mold cavity. If the knob is very deep, there may be a separate insert inside of the flared end of the tube which is flared at a smaller angle, or a separate insert flared more than the end of the tube may be located outside of the tube to provide support for the knob at diameters spaced different distances from the uncovered portion of the tube. A similar result is accomplished by cutting different flared sections of the tube which are of different diameters and telescoped into one another. These may be flared at different angles so that they support the knob at different distances away from the tube.

The invention will be further described in FIGS. 1 to 9, in connection with a plain-surfaced door knob formed on the flared end of a tube of an elastomeric vinyl as a plastisol, although a nylon, etc. powder or a plastic containing gasifiable particles may be used. FIGS. 10 to 13 show door knobs similarly formed on different supports.

The mold is heated so that the vinyl plastisol is solidified and fused, or the vinyl powder is fused, or plastic containing gasifiable particles is heated to produce a foam and fuse the plastic.

Whether the mold is heated or the cast product is removed from the mold before heating will depend upon the nature of the material being cast, the shape of the mold, etc.

The outer surface of the knob may be embellished. The mold surface may be polished, sandblasted or scored in some manner depending upon whether it is desired to produce a knob surface which is shiny, or of low gloss or patterned.

In the drawings

Figure 7:
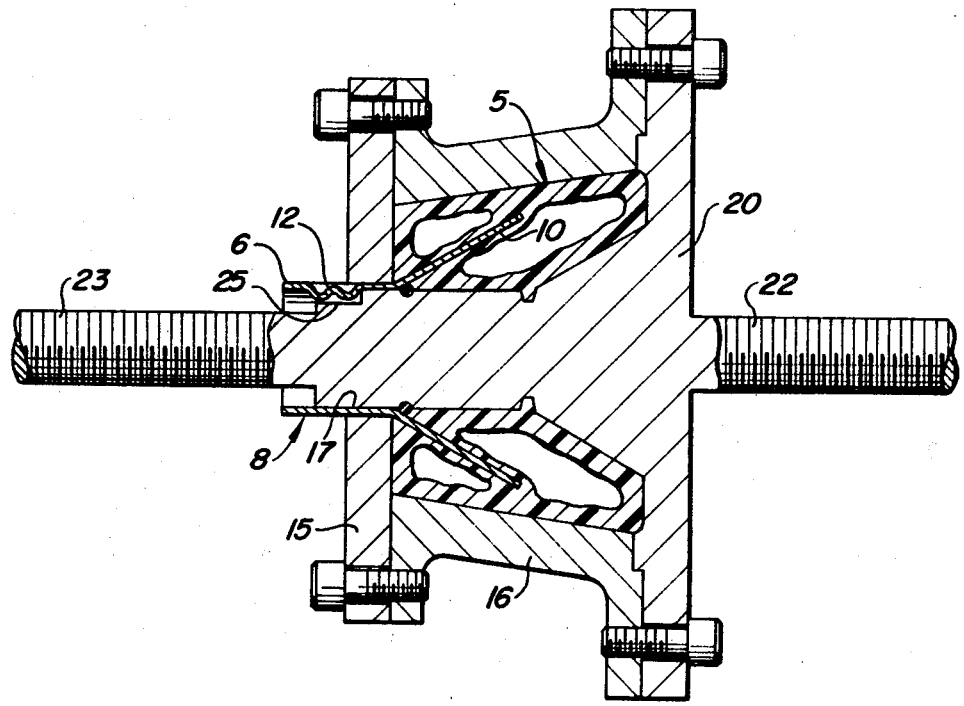
Figure 10:
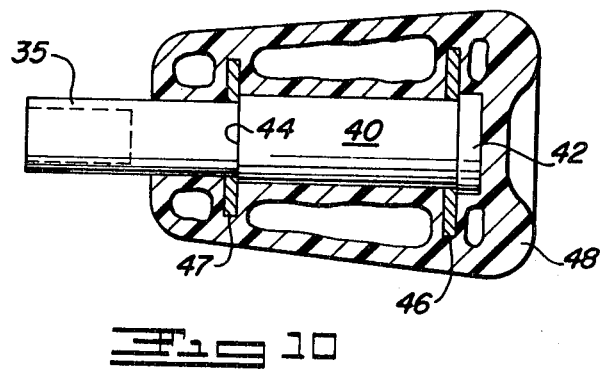
Figure 11:
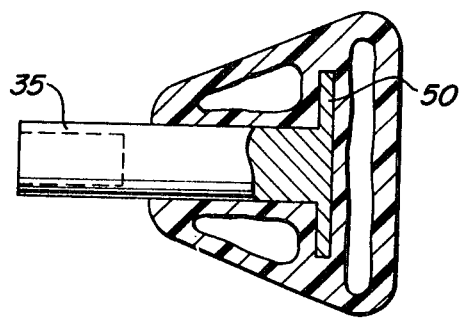
Figures 12, 13:
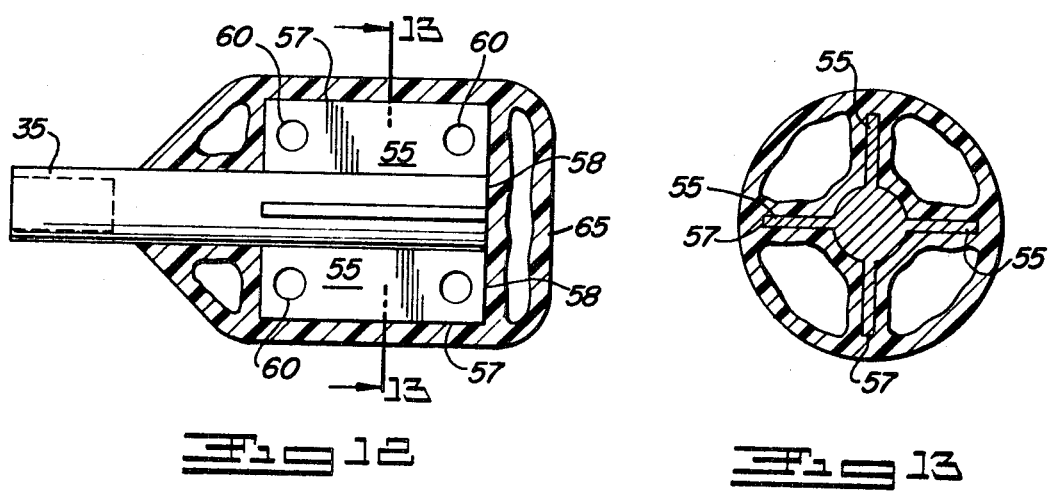

FIG. 1 is a view in perspective of a knob on a tube;
FIG. 2 is a section on the line 2—2 of FIG. 1;
FIG. 3 is a side view of the insert;
FIG. 4 is an end view of the insert;
FIG. 5 is a sectional view of the mold with the insert in place;
FIG. 6 is a section through the closed, empty mold with the insert in place;
FIG. 7 is a section through the closed mold after completion of the knob;
FIG. 8 is a sectional exploded view of the mold with the section of the finished knob taken on the line 8—8 of FIG. 9;
FIG. 9 is a sectional view of the knob on the line 9—9 of FIG. 8;
FIGS. 10, 11 and 12 are sections through knobs formed around different inserts; and
FIG. 13 is a section on the line 13—13 of FIG. 12.

On casting, the surface of the plastic which contacts the form takes the shape of the form, and the opposite surface may be somewhat irregular.

The elastomeric knob 5 is formed on the rigid tube 6, the tube usually being composed of metal. In the drawings the insert 8 is produced by flaring the end of the tube. The insert is usually rigid, but if separate from the tube it may be somewhat flexible. The insert 8 is formed by cutting the end of the tube along spaced lines arranged longitudinally of the tube, and then flaring the cut sections or leaves 10 out at a desired angle. Holes 11 are drilled through the tube before cutting the leaves to prevent hairline fracture of the insert during the flaring operation. The leaves are flared from the tube 6 at an angle not substantially greater than 20°, but this angle may be varied as desired. Although four leaves are shown, this number may be varied as desirable. The four leaves are of the same length but they may be made of different lengths, and the longer ones may be flared outwardly at a lesser or greater angle than the shorter ones to provide support at a different diameter of the knob. It will be noted that the tube 6 is not of uniform circumference because of the irregularity 12 which is provided for a purpose to be explained. The bead 14 on the insert makes a tight fit with the tube to prevent leakage of the plastisol.

The mold comprises the base member 15 to which the annular wall 16 of the cavity is bolted. The base is provided with an opening 17 to receive the tube 6 and the clearance between the opening and the tube is such as to prevent leakage of the plastisol.

The cover portion 20 of the insert fits down into the mold cavity and the lower portion extends through the tube 6 and forms a tight fit with the interior of the tube so as to prevent leakage of the plastisol into the interior of the tube 6. The cover is bolted on to the sidewall 16. This type of mold is used to produce hollow knobs and is provided above and below with the threaded (or unthreaded) extensions 22 and 23 (FIG. 7) for rotational support during the rotational casting operation. The irregularity 12 is positioned in the slotted depression 25 to lock the knob on the latch cylinder so that the knob will operate the latch when turned.

The portion 30 (FIG. 2) of the knob farthest from the tube 6 is not supported by separate means. The archlike configuration of the plastic at 30 which forms the face of the knob is sufficiently strong to avoid the necessity of any internal support.

In casting the knob, the required amount of plastisol is charged to the mold. The spaces between the leaves permit flow of the plastisol to all portions of the interior of the mold cavity and, as the mold is rotated on different axes the plastisol is deposited and subsequently fused on the entire inner surface of the cavity and over the leaves. As clearly shown in FIGS. 2 and 7, the plastic covering on the leaves 10 joins the plastic which forms the wall of the knob.

FIGS. 10–13 illustrate different knobs formed on the ends of rods instead of tubes. The ends 35 of the rods are countersunk so that the knobs can be fastened to the shaft in a door lock, as by a setscrew (not shown).

The rod 40 of FIG. 10 is formed with an enlargement 42 at the end opposite the hollowed out portion 35. Also it is stepped at 44, and washers 46 and 47 fit against the resulting radial surfaces during the rotational casting operation. During the casting, the plastisol covers the exposed surfaces of the mold and something of a bulge 48 which serves as the face of the knob forms around the circumference to serve as a bumper to absorb the shock when the knob hits a wall. Even though the deposit which is formed be of elastomeric material, it is thick enough and strong enough to give the impression of substance to one grasping the knob.

No washers are used in FIG. 11. The insert is cast on or otherwise fabricated with the flat disc projection 50 at one end.

The shaft in FIG. 12 is provided with a number of fins 55 which extend radially from the shaft. The edges 57 of these are so close to the sidewall of the mold that during rotational casting, the plastic bridges the distance between these edges and the wall of the mold. Also the ends 58 of the fins are covered with plastic. This construction serves as a cushioned stopper when the face 65 of the knob hits a wall. It is desirable to provide openings 60 in the fins so that the plastic can flow freely to all parts of the mold during the early stages of the casting; these openings may or may not be filled with the plastic when the casting operation is completed.

A plastisol or polyurethane or other suitable plastic which contains an ingredient which releases a gas on heating, may be used. It may be desirable to first coat the mold surface with a vinyl plastisol or the like which contains none of the gas-emitting ingredient, and then add a plastisol or polyurethane which contains such an ingredient. The gas is released when a deposit of vinyl plastic is heated to fuse it, and when a polyurethane deposit cures either with or without the application of external heat.

It is obvious that other plastic may be used to form the knobs, whether or not they contain a gas-emitting ingredient.

I claim:

1. A knob assembly which comprises a support in combination with a one-piece flexible, hollow, plastic knob on the support, the knob being so designed that the end face thereof acts as a bumper when it contacts another surface, the whole of the outer surface of the support within the knob being covered with plastic, which covering is integral with the plastic of the knob.

2. The assembly of claim 1 in which the support is a tube which is flared outwardly within the knob and is divided into sections therein to facilitate such outward flare.